United States Patent
Lawson et al.

[11] 4,099,849
[45] Jul. 11, 1978

[54] WIDE ANGLE OBJECTIVE

[75] Inventors: John A. Lawson, Scarborough; Ellis I. Betensky, Toronto, both of Canada

[73] Assignee: Vivitar Corporation, Santa Monica, Calif.

[21] Appl. No.: 492,403

[22] Filed: Jul. 29, 1974

Related U.S. Application Data

[63] Continuation-in-part of Ser. No. 392,118, Aug. 27, 1973, abandoned.

[51] Int. Cl.² .............................................. G02B 9/64
[52] U.S. Cl. .................................................. 350/214
[58] Field of Search ........................................ 350/214

[56]  References Cited
U.S. PATENT DOCUMENTS

| | | | |
|---|---|---|---|
| 3,033,082 | 5/1962 | Merigold | 350/214 |
| 3,277,784 | 10/1966 | Hudson | 350/214 X |
| 3,507,559 | 4/1970 | Mori | 350/214 |
| 3,583,791 | 6/1971 | Mori | 350/214 |
| 3,832,037 | 8/1974 | Nakagawa | 350/214 |
| 3,856,385 | 12/1974 | Takahashi | 350/214 |
| 3,870,402 | 3/1975 | Takahashi et al. | 350/214 |
| 3,975,090 | 8/1976 | Lawson | 350/214 |

FOREIGN PATENT DOCUMENTS

| | | | |
|---|---|---|---|
| 46,553 | 3/1966 | Fed. Rep. of Germany | 350/214 |
| 661,922 | 4/1964 | Italy | 350/214 |
| 4,528,832 | 9/1970 | Japan | 350/214 |

Primary Examiner—Paul A. Sacher
Attorney, Agent, or Firm—DeLio and Montgomery

[57] ABSTRACT

This disclosure relates to a Wide Angle Lens of the retrofocus type having a new lens group arrangement which comprises from the object end to the image end a first negative group, a second negative group in the form of a meniscus having a concave image side surface, a third positive group having a convex object side surface, a fourth positive group having a convex image side surface, a fifth negative group, and a sixth positive group having convex image and object side surfaces.

33 Claims, 12 Drawing Figures

WIDE ANGLE OBJECTIVE

This application is a continuation-in-part of co-pending application Ser. No. 392,118 filed Aug. 27, 1973, now abandoned.

This invention relates to lenses, and more particularly to those known as wide angle lenses of the retrofocus type.

Wide angle lenses may be defined as those in which the diameter of the film or image frame of the camera with which the lens is used is substantially equal to or greater than the equivalent focal length of the lens. Moderately wide angle rectrofocus objectives covering field angles of approximately 80° have been known for many years. Typically these lenses have been large in length and diameter resulting in considerable manufacturing expense and a lack of portability. In order to reduce the size, it is necessary to increase the lens element powers which normally increase the lens surface aberration contributions. When wide angle objectives of reduced size configuration are constricted to relative apertures of $f/2.8$, the need to correct large aperture dependence aberrations is apparent; however, when relative apertures of approximately $f/2.0$ or greater are desired, the amount of zonal spherical aberration and aperture dependent coma is considerably increased. Moreover, due to the large lens element powers, the amount of field curvature of third order and greater becomes excessive. Even though the aperture dependent aberrations may be well corrected, the zonal field curvature and astigmatism will severely limit resolution.

The present invention provides a new and improved lens configuration for wide angle objectives through the employment of a new lens grouping arrangement which minimizes the lens element powers in order to obtain the necessary back focal distance and front vertex distance as required to be useful in single lens reflex cameras. The minimization of the lens group powers decreases the surface contributions to distortion and various aberrations.

Briefly stated, a wide angle lens embodying the invention comprises a first lens group from the object end to the image end which is afocal, a second diverging group, third and fourth converging groups, a fifth diverging group and a sixth converging group. The lens groups and elements, and particularly the fourth group, have relative powers and configurations to achieve the objects of the invention, as hereinafter more specifically pointed out.

An object of this invention is to provide a new and improved wide angle lens of the retrofocus type.

Another object of this invention is to provide a lens of the type described of large relative aperture with minimized field curvature and astigmatism.

A further object of this invention is the provision of a lens of the type described having the capability of focusing to very close object distance without introduction of unacceptable field curvature and astigmatism.

The features of the invention which are believed to be novel are particularly pointed out and distinctly claimed in the concluding portion of this specification. However, the invention both as to its organization and operation, together with further objects and advantages thereof, may best be appreciated by reference to the following detailed description taken in conjunction with the drawings, wherein:

In all lens designs, the elemental groupings and spacings thereof are chosen to minimize aberrations and distortion of the overall lens and generally provide a true image of an object. The lens groupings are chosen to provide a lens of given field angle or equivalent focal length for a specified image quality. Therefore, the contribution of each lens group or element in multi-element lens is incapable of precise definition inasmuch as all lens configurations are selected in view of the others to provide the desired result.

The objects of the present invention are achieved by the provision of a new grouping of lens elements as hereinafter described.

A lens embodying the invention as disclosed comprises six lens groups from the object end to the image end as follows:

I. A two element group of negative power.
II. A meniscus of negative power.
III. A positive element having a convex front surface.
IV. A positive element or doublet having a concave front surface and a convex rear surface.
V. A meniscus of negative power, and
VI. A positive doublet.

Figures 1, 2, 3, 4, 5:
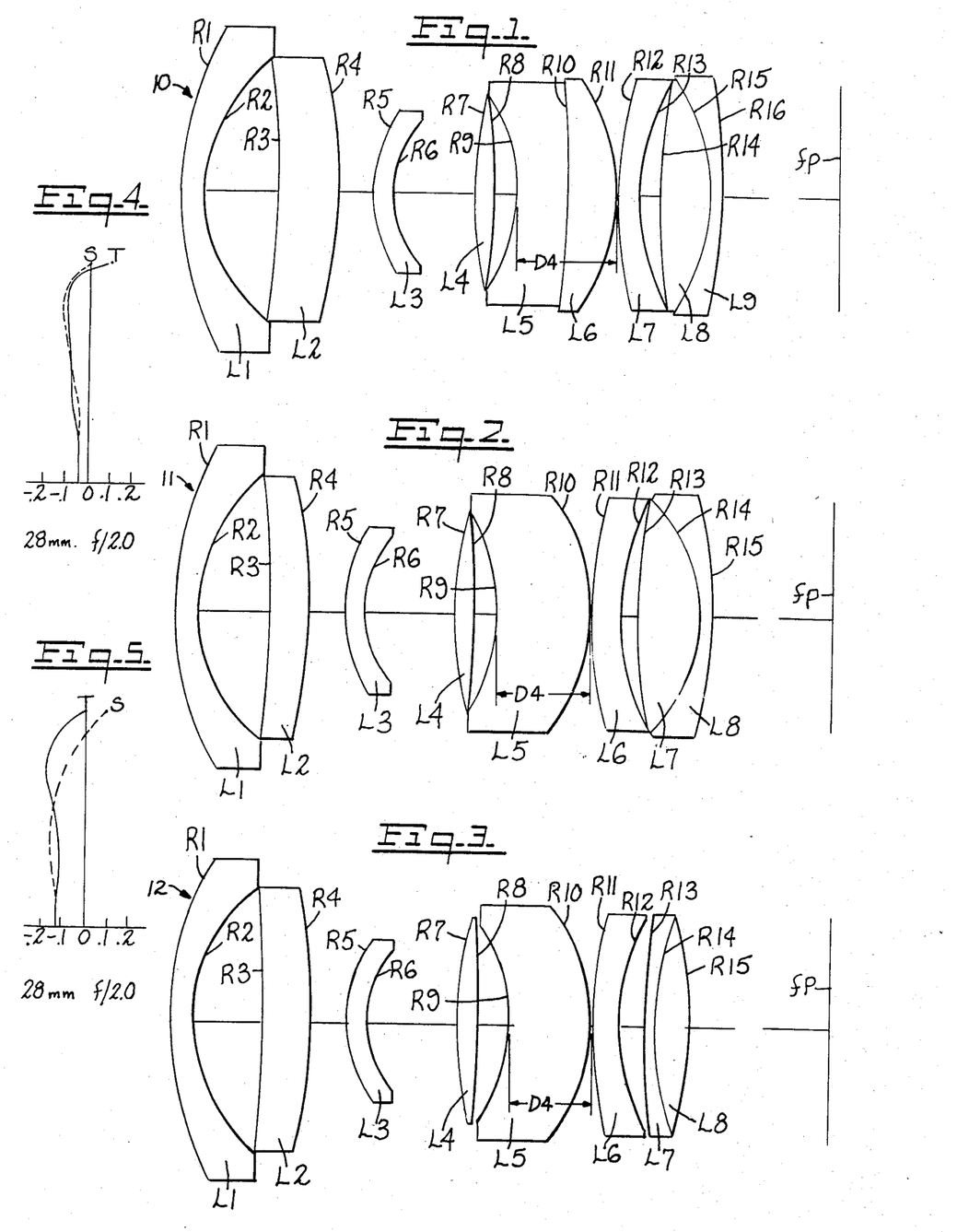
FIGS. 1 - 3 are side elevations of lens embodying the invention.
FIGS. 4 and 5 are curves illustrating the improved performance of the lens of FIG. 1.

A first lens 10 embodying the invention is set forth in FIG. 1, and comprises nine lens elements L1 - L9, arranged in six lens groups. The surfaces of the elements L1 - L9 are defined in radii R1 - R16 as shown. The first group viewed from the object end to the image end comprises elements L1 and L2 which are, as a combination, afocal with respect to the equivalent focal length (EFL) of the overall lens. The second group II is comprised of a meniscus L3 of negative power (diverging). The third group III is comprised of a biconvex element L4 of positive power (converging). The fourth group IV is comprised of a contacting doublet L5 and L6 of positive power (converging). The fifth group V is comprised of a negative meniscus (diverging) and the sixth group VI is a contacting doublet of positive power (diverging). This lens is defined by the data set forth in Table I.

A second lens 11 embodying the invention is set forth in FIG. 2 and comprises lens elements L1 - L8, arranged in six groups of the same relative powers as the lens of FIG. 1. Lens 11 differs from lens 10 primarily in that Group IV comprises a single element L5, but which is still of positive power (converging). Lens 11 is defined by the data set forth in Table II.

Another lens 12 is shown in FIG. 3 and comprises the six group I - VI of the same relative power as lens 11, having eight elements L1 - L8. The lens surfaces are defined on radii R1 - R15 as shown. Lens 12 differs from lens 11 primarily in that Group VI, elements L7 and L8, is comprised of a meniscus and a contacting bi-convex element in that order, rather than vice-versa, as lens 11. Lens 12 is defined by the data as set forth in Table III.

In the tables the index of refraction is denoted as $N_d$ and the dispersion as referenced by the Abbe number is denoted by $V_d$.

Table I sets forth data on lens 10 of FIG. 1 scaled to an EFL of 28.7mm for a 24 × 36mm image frame, and having a relative aperture of F/1.9.

TABLE I

FIG. 1

| Lens | | Radius | Axial Distance Between Surfaces | $N_d$ | $V_d$ |
|---|---|---|---|---|---|
| L1 | R1 | 38.387mm | | | |
| | | | 2.435mm | 1.5168 | 64.2 |
| | R2 | 18.755 | | | |
| | | | 8.5083 | | |
| L2 | R3 | −119.389 | | | |
| | | | 7.167 | 1.7995 | 42.3 |
| | R4 | −52.877 | | | |
| | | | 4.72–0.20 | | |
| L3 | R5 | 18.178 | | | |
| | | | 2.180 | 1.5831 | 59.5 |
| | R6 | 12.456 | | | |
| | | | 9.369 | | |
| L4 | R7 | 49.0379 | | | |
| | | | 2.159 | 1.8306 | 36.5 |
| | R8 | −123.776 | | | |
| | | | 2.581 | | |
| L5 | R9 | −22.141 | | | |
| | | | 6.000 | 1.7470 | 27.5 |
| L6 | R10 | −109.562 | | | |
| | | | 5.774 | 1.7620 | 40.3 |
| | R11 | −21.131 | | | |
| | | | 0.135 | | |
| L7 | R12 | 55.725 | | | |
| | | | 2.454 | 1.8467 | 23.8 |
| | R13 | 26.386 | | | |
| | | | 2.239 | | |
| | R14 | 76.751 | | | |
| L8 | | | 6.000 | 1.8042 | 46.5 |
| | R15 | −22.374 | | | |
| L9 | | | 1.500 | 1.8052 | 25.5 |
| | R16 | −54.363 | | | |

BFL = 38.8mm
The aperture stop is located 8.4mm after L3.
The spacing between elements L2 and L3 varies from 0.20mm to 4.72mm for focusing from infinity to 178.4mm. Elements L3 - L9 move in fixed relation as a group during focusing travel.

Table II sets forth data on lens 11 of FIG. 2 scaled to an EFL of 28.7mm for a 24 × 36mm image frame, and having a relative aperture of F/2.0.

TABLE II

FIG. 2

| Lens | | Radius | Axial Distance Between Surfaces | $N_d$ | $V_d$ |
|---|---|---|---|---|---|
| L1 | R1 | 38.570mm | | | |
| | | | 2.435mm | 1.5168 | 64.2 |
| | R2 | 19.187 | | | |
| | | | 8.508 | | |
| L2 | R3 | −118.121 | | | |
| | | | 4.797 | 1.7995 | 42.3 |
| | R4 | −53.498 | | | |
| | | | 4.000–0.25 | | |
| L3 | R5 | 18.556 | | | |
| | | | 2.180 | 1.5831 | 59.5 |
| | R6 | 12.336 | | | |
| | | | 10.615 | | |
| L4 | R7 | 50.120 | | | |
| | | | 2.159 | 1.8306 | 36.5 |
| | R8 | −160.5232 | | | |
| | | | 2.581 | | |
| L5 | R9 | −22.590 | | | |
| | | | 10.883 | 1.7600 | 47.5 |
| | R10 | −21.050 | | | |
| | | | 0.135 | | |
| L6 | R11 | 51.8954 | | | |
| | | | 3.257 | 1.8467 | 23.8 |
| | R12 | 26.298 | | | |
| | | | 2.239 | | |
| | R13 | 77.064 | | | |
| L7 | | | 7.000 | 1.8042 | 46.5 |
| | R14 | −18.570 | | | |
| L8 | | | 1.500 | 1.8052 | 25.5 |
| | R15 | −51.214 | | | |

BFL = 39.0mm
The aperture stop is located 9.55mm behind L3. Elements L3 - L8 move in fixed relation as a group for focusing while L1 and L2 are stationary. The spacing between elements L2 and L3 varies from 0.25mm to 4.00mm for focusing from infinity to 178mm.

Table III sets forth data on lens 12 of FIG. 3 scaled to an EFL of 28.7mm for a 24×36mm image frame and having a relative aperture of F/2.0.

TABLE III

FIG. 3

| Lens | | Radius | Axial Distance Between Surfaces | $N_d$ | $V_d$ |
|---|---|---|---|---|---|
| L1 | R1 | 39.897mm | | | |
| | | | 2.435mm | 1.520 | 65.6 |
| | R2 | 19.832 | | | |
| | | | 8.500 | | |
| L2 | R3 | −111.180 | | | |
| | | | 5.835 | 1.802 | 47.5 |
| | R4 | −55.111 | | | |
| | | | 4.000–0.25 | | |
| L3 | R5 | 17.557 | | | |
| | | | 2.180 | 1.807 | 44.3 |
| | R6 | 2.193 | | | |
| | | | 10.789 | | |
| L4 | R7 | 47.013 | | | |
| | | | 2.433 | 1.833 | 41.8 |
| | R8 | −138.976 | | | |
| | | | 3.390 | | |
| L5 | R9 | −23.286 | | | |
| | | | 9.700 | 1.837 | 51.9 |
| | R10 | −21.573 | | | |
| | | | 0.135 | | |
| L6 | R11 | 51.904 | | | |
| | | | 3.324 | 1.848 | 23.4 |
| | R12 | 26.009 | | | |
| | | | 2.682 | | |
| | R13 | 85.346 | | | |
| L7 | | | 1.000 | 1.848 | 23.4 |
| | R14 | 31.429 | | | |
| L8 | | | 4.000 | 1.776 | 50.6 |
| | R15 | −43.746 | | | |

BFL = 39.9mm
The aperture stop is located 10.79mm behind L3. The spacing between elements L2 and L3 varies between 0.25mm and 4.00mm for focusing from inifinity to 178mm. Elements L3 - L8 move in fixed relation as a group for focusing while L1 and L2 are stationary.

In the examples of Tables I - III, all lens have a rated EFL of 28mm and a rated equivalent aperture of F/1.9, as scaled to a film or image frame size of 24 × 36mm. The lenses may, of course, be scaled to other image frame sizes, and EFL's.

FIGS. 4 and 5 exemplify plots of image height versus focal plane shift for the lens of FIG. 1, and a known wide angle lens scaled to 28mm EFL and a stated relative aperture of F/2.0, respectively, as shown in U.S. Pat. No. 3,736,049. Comparisons were made at a magnification of M = −0.025 for a half image height of 20mm, for both sagittal S and tangential T rays.

The curves of FIG. 4 are relatively close together evidencing essential elimination of astigmatism. The curves of FIG. 4 have less deviation from the vertical, and are generally flatter than those of FIG. 5, to evidence a substantial reduction in field curvature.

The lenses of Tables I, II and III are designed for the first group elements L1 and L2 to be stationary while the rear elements are shifted in fixed relation as a group for focusing, as disclosed and claimed in the copending application of John A. Lawson, Ser. No. 492,413, filed July 29, 1974.

However, the lens Groups may also be arranged to move differentially as in the conventional wide angle objectives. For example, the entire objective may be shifted for focusing, while the fourth and fifth lens Groups move differentially in a well known manner. Also, the lens may be arranged to move only Groups V and VI for focusing, as disclosed and claimed in U.S. Pat. No. 3,975,090.

Further examples of lenses embodying the invention are set forth in FIGS. 6 - 10, and Tables IV - IX. In all of the examples, Group IV is an air spaced doublet L5, L6.

Figure 6:
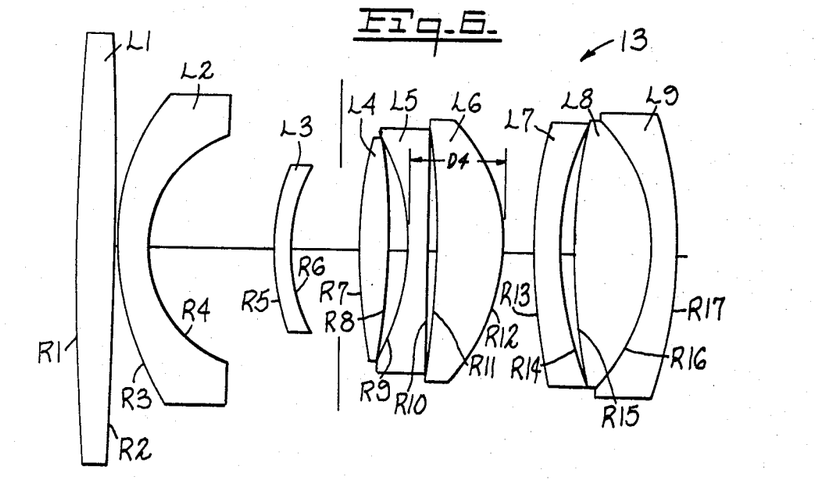
FIGS. 6 - 10 are side elevations of additional lens embodying the invention.

Table IV sets forth data on the lens 13 of FIG. 6 as scaled to an EFL of 28.5mm for a 24 × 36mm image plane, and having a relative aperture of F/1.9.

TABLE IV

FIG. 6

| Lens | | Radius(mm) | Axial Distance Between Surfaces(mm) | $N_d$ | $V_d$ |
|---|---|---|---|---|---|
| L1 | R1 | 155.101 | | | |
|  | R2 | −541.744 | 4.160 | 1.562 | 58.52 |
|  |  |  | .300 | | |
| L2 | R3 | 29.242 | | | |
|  | R4 | 13.031 | 3.000 | 1.487 | 70.4 |
|  |  |  | 12.759 | | |
| L3 | R5 | 22.898 | | | |
|  | R6 | 15.520 | 2.000 | 1.800 | 42.3 |
|  |  |  | 8.692 | | |
| L4 | R7 | 48.249 | | | |
|  | R8 | −70.561 | 3.200 | 1.785 | 25.7 |
|  |  |  | 1.967 | | |
| L5 | R9 | −24.204 | | | |
|  | R10 | −1430.264 | 2.164 | 1.805 | 25.5 |
|  |  |  | .844 | | |
| L6 | R11 | −94.529 | | | |
|  | R12 | −19.767 | 5.504 | 1.800 | 42.3 |
|  |  |  | 3.550−1.028 | | |
| L7 | R13 | 45.215 | | | |
|  | R14 | 29.179 | 2.580 | 1.847 | 23.8 |
|  |  |  | 1.700 | | |
| L8 | R15 | 70.687 | | | |
|  | R16 | −19.969 | 8.00 | 1.743 | 49.2 |
|  |  |  | 2.700 | 1.847 | 23.8 |
| L9 | R17 | −44.577 | | | |

The aperture stop is located 7.18mm after L3. The BFL varies from 39.68mm to 44.34mm as the lens is focused from infinity to an object distance of 174.7mm. All lens elements move for focusing and the space between Groups IV and V moves differentially as shown.

Figure 7:
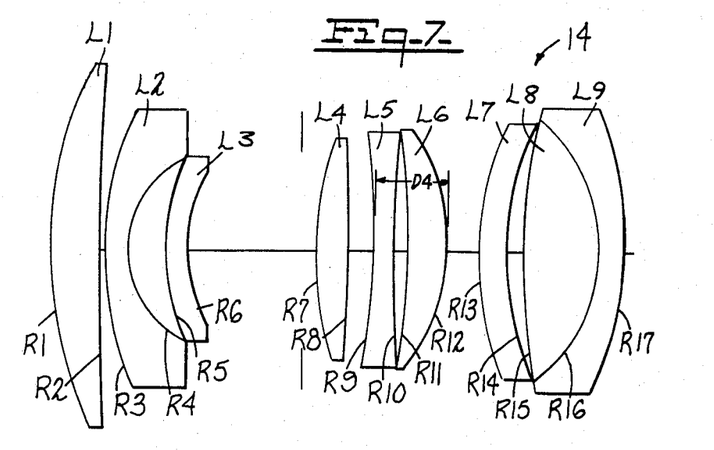

Table V sets forth data on a lens 14 substantially as shown in FIG. 7 scaled to an EFL of 28.6mm for a 24 × 36mm frame size and a relative aperture of F/1.9.

TABLE V

FIG. 7

| Lens | | Radius(mm) | Axial Distance Between Surfaces(mm) | $N_d$ | $V_d$ |
|---|---|---|---|---|---|
| L1 | R1 | 42.160 | | | |
|  | R2 | 384.104 | 5.700 | 1.487 | 70.4 |
|  |  |  | .300 | | |
| L2 | R3 | 35.935 | | | |
|  | R4 | 11.488 | 2.800 | 1.487 | 70.4 |
|  |  |  | 4.032 | | |
| L3 | R5 | 26.721 | | | |
|  | R6 | 15.510 | 2.000 | 1.517 | 64.2 |
|  |  |  | 14.343 | | |
| L4 | R7 | 39.692 | | | |
|  | R8 | 925.392 | 3.200 | 1.689 | 31.2 |
|  |  |  | 2.973 | | |
| L5 | R9 | −76.847 | | | |
|  | R10 | 97.091 | 2.164 | 1.847 | 23.8 |
|  |  |  | 1.750 | | |
| L6 | R11 | −75.162 | | | |
|  | R12 | −21.352 | 4.549 | 1.800 | 42.3 |
|  |  |  | 4.098−.100 | | |
| L7 | R13 | 37.634 | | | |
|  | R14 | 32.248 | 2.700 | 1.722 | 29.2 |
|  |  |  | 2.000 | | |
| L8 | R15 | 70.613 | | | |
|  | R16 | −18.940 | 8.400 | 1.641 | 59.8 |
|  |  |  | 2.700 | 1.805 | 25.5 |
| L9 | | | | | |

TABLE V-continued

FIG. 7

| Lens | Radius(mm) | Axial Distance Between Surfaces(mm) | $N_d$ | $V_d$ |
|---|---|---|---|---|
| R17 | −42.358 | | | |

The aperture stop is located 12.3mm after L3. The BFL varies from 39.2mm to 43.2mm as the lens is focused from infinity to an object distance of 203mm. Groups I-IV are stationary while Groups V and VI (elements L7-L9) move in fixed relation for focusing.

Figure 8:
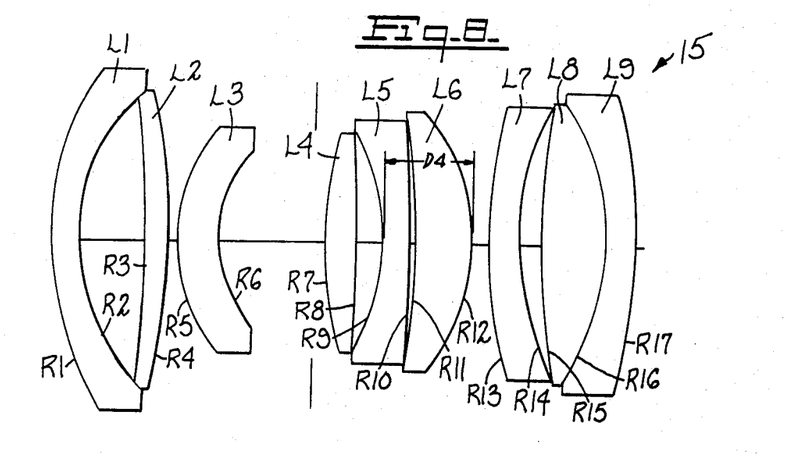

Table VI sets forth data on lens 15 of FIG. 8 scaled to an EFL of 35.0mm for a 24 × 36mm image frame, and a relative aperture of F/2.0.

TABLE VI

FIG. 8

| Lens | | Radius(mm) | Axial Distance Between Surfaces(mm) | $N_d$ | $V_d$ |
|---|---|---|---|---|---|
| L1 | R1 | 31.195 | | | |
|  | R2 | 20.569 | 2.998 | 1.517 | 64.2 |
|  |  |  | 7.074 | | |
| L2 | R3 | −96.642 | | | |
|  | R4 | −58.277 | 2.829 | 1.785 | 25.7 |
|  |  |  | 0.726 | | |
| L3 | R5 | 18.356 | | | |
|  | R6 | 12.649 | 4.321 | 1.723 | 38.0 |
|  |  |  | 11.925 | | |
| L4 | R7 | 53.996 | | | |
|  | R8 | −172.838 | 2.800 | 1.831 | 36.5 |
|  |  |  | 3.000 | | |
| L5 | R9 | −22.950 | | | |
|  | R10 | −276.177 | 2.695 | 1.741 | 27.8 |
|  |  |  | 0.720 | | |
| L6 | R11 | −76.849 | | | |
|  | R12 | −19.800 | 6.081 | 1.757 | 47.7 |
|  |  |  | 2.000−0.20 | | |
| L7 | R13 | 51.599 | | | |
|  | R14 | 31.353 | 3.000 | 1.847 | 23.8 |
|  |  |  | 2.332 | | |
| L8 | R15 | 82.914 | | | |
|  | R16 | −25.647 | 7.000 | 1.800 | 42.3 |
|  |  |  | 3.00 | | |
| L9 | R17 | −57.034 | | 1.805 | 25.5 |

BFL = 40.5
The aperture stop is located 10.73mm after element L3. The space between Groups IV and V varies as shown for close focus compensation at a linear rate as the lens focuses to 230.1mm. The entire lens also shifts for focusing.

Figure 9:
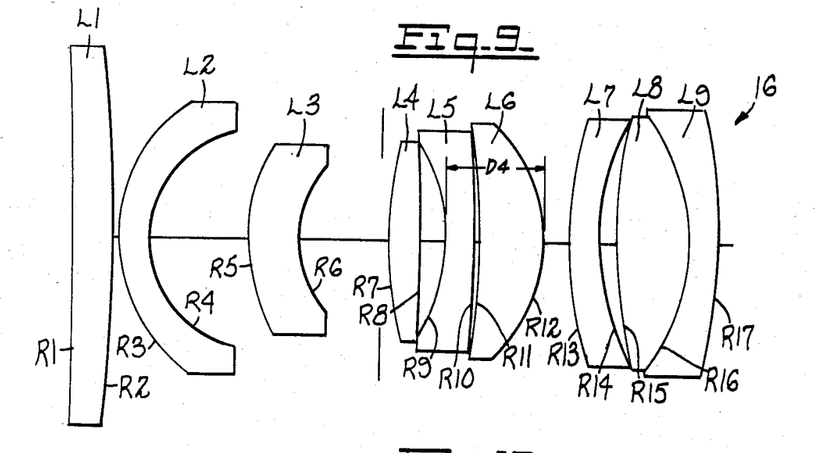

Table 7 sets forth data on lens 16 of FIG. 9 scaled to an EFL of 35.0mm for a 24 × 36mm image frame, and a relative aperture of F/1.9.

TABLE VII

FIG. 9

| Lens | | Radius | Axial Distance Between Surfaces | $N_d$ | $V_d$ |
|---|---|---|---|---|---|
| L1 | R1 | 1598.84mm | | | |
|  | R2 | −175.71 | 4.160mm | 1.750 | 35.0 |
|  |  |  | .300 | | |
| L2 | R3 | 22.57 | | | |
|  | R4 | 13.99 | 2.985 | 1.487 | 70.4 |
|  |  |  | 9.079 | | |
| L3 | R5 | 23.40 | | | |
|  | R6 | 15.49 | 5.005 | 1.700 | 47.8 |
|  |  |  | 8.869 | | |
| L4 | R7 | 58.80 | | | |
|  | R8 | −100.28 | 3.200 | 1.831 | 36.5 |
|  |  |  | 2.385 | | |
| L5 | R9 | −24.54 | | | |
|  | R10 | −845.99 | 2.358 | 1.741 | 27.8 |
|  |  |  | 6.80 | | |
| L6 | R11 | −102.81 | | | |
|  | R12 | −19.97 | 6.778 | 1.757 | 47.7 |

TABLE VII-continued
FIG. 9

| Lens | Radius | Axial Distance Between Surfaces | $N_d$ | $V_d$ |
|---|---|---|---|---|
| L7 | R13 | 0.91–3.66 | | |
| | | 3.000 | 1.847 | 23.8 |
| | R14 | 32.65 | | |
| | | 1.700 | | |
| L8 | R15 | 65.28 | | |
| | | 7.300 | 1.800 | 42.3 |
| | R16 | −27.00 | | |
| L9 | | 0 | 1.805 | 25.5 |
| | R17 | −79.24 | | |

BFL = 39.48 – 45.28mm as lens is focused from infinity to 221.3mm. The aperture stop is located 7.54mm after element L3. The BFL varies from 39.48mm to 45.28mm as the lens is focused from infinity to 221.3mm. The spacing between Groups IV and V also varies as shown.

221.3

Figure 10:
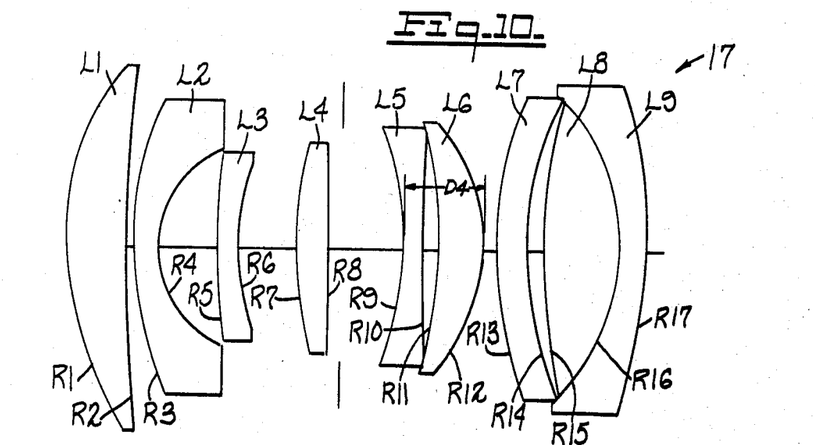

Table VIII sets forth data on lens 17 of FIG. 10 scaled to an EFL of 35.0mm for a 24 × 36mm image frame, and a relative aperture of F/1.9.

TABLE VIII
FIG. 10

| Lens | Radius(mm) | Axial Distance Between Surfaces(mm) | $N_d$ | $N_d$ |
|---|---|---|---|---|
| L1 | R1 | 30.600 | | |
| | | 7.000 | 1.487 | 70.4 |
| | R2 | 170.290 | | |
| | | .300 | | |
| L2 | R3 | 34.231 | | |
| | | 2.985 | 1.487 | 70.4 |
| | R4 | 11.567 | | |
| | | 6.000 | | |
| L3 | R5 | 67.235 | | |
| | | 2.000 | 1.569 | 56.0 |
| | R6 | 25.201 | | |
| | | 6.171 | | |
| L4 | R7 | 46.077 | | |
| | | 3.200 | 1.806 | 40.7 |
| | R8 | −644.608 | | |
| | | 7.931 | | |
| L5 | R9 | −34.424 | | |
| | | 2.358 | 1.762 | 26.6 |
| | R10 | −829.911 | | |
| | | 1.350 | | |
| L6 | R11 | −47.763 | | |
| | | 4.832 | 1.757 | 47.7 |
| | R12 | −19.289 | | |
| | | 4.70–.10 | | |
| L7 | R13 | 41.514 | | |
| | | 3.000 | 1.667 | 33.1 |
| | R14 | 35.544 | | |
| | | 1.900 | | |
| L8 | R15 | 64.725 | | |
| | | 8.000 | 1.717 | 48.0 |
| | R16 | −22.414 | | |
| L9 | | 2.700 | 1.805 | 25.5 |
| | R17 | −56.648 | | |

The BFL varies from 39.56mm to 44.16mm as the lens is focused from infinity to 258mm, and the spacing between Groups IV and V varies as shown. The aperture stop is located 1.59mm behind element L4.

Table IX sets forth data on a lens substantially as shown in FIG. 7 scaled to an EFL of 28.5mm for a 24 × 36mm frame size and a relative aperture of F/1.9.

TABLE IX
FIG. 7

| Lens | Radius(mm) | Axial Distance Between Surfaces(mm) | $N_d$ | $V_d$ |
|---|---|---|---|---|
| L1 | R1 | 54.600 | | |
| | | 5.700 | 1.487 | 70.4 |
| | R2 | 937.48 | | |
| | | .300 | | |
| L2 | R3 | 28.640 | | |
| | | 2.800 | 1.487 | 70.4 |
| | R4 | 11.392 | | |
| | | 4.474 | | |
| L3 | R5 | 28.640 | | |
| | | 2.000 | 1.517 | 64.2 |
| | R6 | 15.990 | | |
| | | 13.502 | | |
| L4 | R7 | 41.450 | | |
| | | 3.200 | 1.689 | 31.2 |
| | R8 | 840.70 | | |

TABLE IX-continued
FIG. 7

| Lens | Radius(mm) | Axial Distance Between Surfaces(mm) | $N_d$ | $V_d$ |
|---|---|---|---|---|
| | | 3.342 | | |
| L5 | R9 | −70.750 | | |
| | | 2.164 | 1.805 | 25.5 |
| | R10 | 106.030 | | |
| | | 1.900 | | |
| L6 | R11 | −71.649 | | |
| | | 4.549 | 1.804 | 46.5 |
| | R12 | −21.220 | | |
| | | 4.098–.10 | | |
| L7 | R13 | 48.140 | | |
| | | 2.700 | 1.741 | 27.8 |
| | R14 | 35.430 | | |
| | | 1.212 | | |
| L8 | R15 | 53.960 | | |
| | | 9.159 | 1.639 | 55.5 |
| | R16 | −20.430 | | |
| L9 | | 2.700 | 1.805 | 25.5 |
| | R17 | −44.190 | | |

The aperture stop is located 11.5mm behind L3, Groups V and VI move from a BFL of 39.2mm to 43.2mm for focusing from infinity to 203mm while Groups I – IV are fixed with respect to the film plane.

Figure 11:
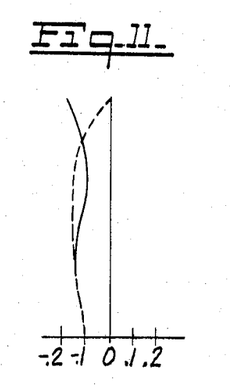
FIGS. 11 and 12 are curves illustrating the improved performance of the lens of FIG. 8.
Figure 12:
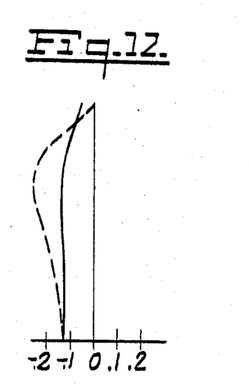

FIGS. 11 and 12 exemplify further comparison of the focal plane shift of the lens of FIG. 8 and the lens of the previously mentioned patent at a magnification of M = −0.025 for a half image height of 20mm, for both sagittal S and tangential T rays.

The curves of FIG. 11 are relatively close together evidencing substantially less astigmatism than FIG. 12. The curves of FIG. 11, particularly in the saggital have less deviation from the vertical, evidencing reduction in field curvature.

As previously mentioned, the contribution of each lens group to an overall lens is incapable of precise definition since properties of one or more elements and groups serve the same function and are complimenting and supplementing each other. However, in the new lens form described, Group IV is designed to provide certain contributions to the overall lens.

Group IV provides a substantial correction for the Petzval sum of the lens. The axial spacing of the front and rear surfaces contributes to correction of field curvature convex toward the object. Additionally, it provides positive power required to shorten the EFL of the overall lens while maintaining the required back focal length (BFL) to make the lens of the retrofocus type. The EFL of Group IV ($F_4$) should have the following relation to the EFL of the overall lens ($F_o$).

$$2.5\, F_o \leq F_4 \leq 6.5\, F_o$$

The foregoing is a critical relation, and other preferred relationships exist which do not have the same criticality. The radius $R_{r4}$ of the rear surface is less than $F_o$, or $$F_o > R_{r4}$$

This relationship contributes to correction for distortion. The axial separation $D_4$ between front and rear surfaces is a substantial percentage of the EFL of the lens and preferably is in the range of $$0.4\, F_o \geq D_4 \geq 0.20\, F_o$$

Additionally, to maintain the desired power contribution the combined EFL of Groups III and IV ($F_{34}$) is preferably $$2.0\, F \geq F_{34} \geq 1.0\, F_o$$

As shown Group IV may be a single element or a doublet, either cemented or air spaced. It might also be defined in three elements. The front surface of Group III, L4, is convex. However, the rear surface may be other than convex depending on the design.

Groups V and VI are of positive power of a magnitude determined by the power of the other elements but in the preferred designs have an EFL ($F_{56}$)

$$4.0 \geq F_{56} \geq 1.0$$

while the EFL ($F_6$) of Group VI is $$2.0 > F_6 \geq 1.0$$

Group III is of positive power to supplement the positive power of Group IV and preferably has an EFL ($F_3$) range $$2.5 \geq F_3 \geq 1.2 F_o$$

The ranges set forth above may be better appreciated in consideration with Table X which tabulates the ratio of the EFL of each group and combinations thereof to the overall EFL of the lens.

TABLE X

| | RATIO OF EFL OF LENS GROUPS TO EFL OF LENS | | | | | | | | |
|---|---|---|---|---|---|---|---|---|---|
| TABLE | GROUP I | GROUP II | GROUP III | GROUP IV | GROUP V | GROUP VI | GROUPS V & VI | GROUPS I - IV | GROUPS III & IV |
| I | −11.541 | −2.740 | 1.472 | 3.299 | −2.124 | 1.4139 | 3.610 | 1.502 | 1.261 |
| II | −10.770 | −2.514 | 1.598 | 3.492 | −2.307 | 1.373 | 3.030 | 1.730 | 1.332 |
| III | −9.415 | −2.105 | 1.478 | 3.410 | −2.276 | 1.394 | 3.251 | 1.688 | 1.249 |
| IV | −2.602 | −2.391 | 1.285 | 5.325 | −3.647 | 1.492 | 2.413 | 2.414 | 1.249 |
| V | −2.282 | −2.656 | 2.088 | 3.132 | −13.743 | 1.854 | 2.178 | 3.202 | 1.446 |
| VI | −15.020 | −2.345 | 1.414 | 4.604 | −2.866 | 1.250 | 2.103 | 2.172 | 1.312 |
| VII | −3.718 | −2.472 | 1.279 | 3.342 | −3.061 | 1.324 | 2.279 | 2.094 | 1.121 |
| VIII | −2.799 | −2.052 | 1.518 | 3.732 | −13.175 | 1.381 | 1.574 | 4.829 | 1.313 |
| IX | −2.429 | −2.589 | 2.200 | 2.952 | −6.933 | 1.662 | 2.179 | 3.190 | 1.459 |

The lenses disclosed may be focused on an object as close as 6.25 EFL's or less than seven inches in the case of the lens of Table IV. In the case of the lens of Table I, the lens is focused to 6.37 EFL or 7.02 inches with minimal astigmatism and field curvature, as exemplified in FIG. 4.

Table XI exemplifies the close focusing capability of the various lens disclosed.

TABLE XI

| LENS | CLOSE FOCUS DISTANCE (FD) | | FD/$_{EFL}$ |
|---|---|---|---|
| TABLE I | 178mm | 7.02 in. | 6.20 |
| II | 178 | 7.02 | 6.20 |
| III | 178 | 7.02 | 6.20 |
| IV | 175 | 6.91 | 6.14 |
| V | 203 | 7.99 | 7.12 |
| VI | 230 | 9.06 | 6.57 |
| VII | 221 | 8.70 | 6.31 |
| VIII | 258 | 10.20 | 7.37 |
| IX | 203 | 7.99 | 7.12 |

It may thus be seen that the objects of the invention set forth above as well as those made apparent are efficiently attained. The invention provides a new wide-angle lens of the retrofocus type having a large relative aperture which will focus to an object distance of less than seven EFL's with minimal astigmatism and field curvature.

While preferred embodiments of the invention have been set forth for purposes of disclosure, other embodiments and modification to the disclosed embodiment of the invention may be derived by others skilled in the art. Accordingly, the appended claims are intended to cover all embodiments and applications of the invention and reversals thereof which do not depart from the spirit and scope of the invention.

What is claimed is:

1. A lens of the retrofocus type which comprises a plurality of lens elements arranged in six groups along a common optical axis from the object end to the image end as follows: a first group of negative power including positive and negative lens element, a second negative group in the form of a meniscus having a concave image side surface, a third positive group having a convex object side surface, a fourth positive group having a concave object side surface and convex image side surface, a fifth negative group consisting of a meniscus having a convex object side surface, and a sixth positive group consisting of a biconvex doublet.

2. The lens of claim 1 further defined by $$6.5 F_o \geq F_4 \geq 2.5 F_o$$

where $F_o$ is the equivalent focal length of the overall lens, and $F_4$ is the equivalent focal length of the fourth group.

3. The lens of claim 1 further defined by $$1.5 F_o \geq F_{34} \geq 1.0 F_o$$

where $F_{34}$ is the combined equivalent focal length of the third and fourth groups, and $F_o$ is the equivalent focal length of the overall lens.

4. The lens of claim 1 further defined in that the first surface of said fourth group is concave and the distance $D_4$ between the first and last surface thereof is $$0.45 F_o \geq D_4 \geq 0.20 F_o$$

where $F_o$ is the equivalent focal length of the overall lens.

5. The lens of claim 1 further defined by $$2.0 F_o \geq F_6 \geq 1.0 F_o$$

where $F_o$ is the equivalent focal length of the overall lens and $F_6$ is the equivalent focal length of the sixth group.

6. The lens of claim 1 further defined by $$2.5 F_o \geq F_3 \geq 1.2 F_o$$

where $F_3$ is the equivalent focal length of said third group, and $F_o$ is the equivalent focal length of the overall lens.

7. The lens of claim 1 further defined by $$5.5 F_o \geq F_4 \geq 2.5 F_o$$

where $F_4$ is the equivalent focal length of said fourth group and $F_o$ is the equivalent focal length of the overall lens.

8. The lens of claim 1 defined by substantially the following data as scaled to an equivalent focal length of 28.7mm.

| Lens | | Radius | Axial Distance Between Surfaces | $N_d$ | $V_d$ |
|---|---|---|---|---|---|
| L1 | R1 | 38.387mm | | | |
| | | | 2.435mm | 1.5168 | 64.2 |
| | R2 | 18.755 | | | |
| | | | 8.5083 | | |
| L2 | R3 | −119.389 | | | |
| | | | 7.167 | 1.7995 | 42.3 |
| | R4 | −52.877 | | | |
| | | | 4.72−0.20 | | |
| L3 | R5 | 18.178 | | | |
| | | | 2.180 | 1.5831 | 59.5 |
| | R6 | 12.456 | | | |
| | | | 9.369 | | |
| L4 | R7 | 49.0379 | | | |
| | | | 2.159 | 1.8306 | 36.5 |
| | R8 | −123.776 | | | |
| | | | 2.581 | | |
| L5 | R9 | −22.141 | | | |
| | | | 6.000 | 1.7470 | 27.5 |
| | R10 | −109.562 | | | |
| L6 | | | 5.774 | 1.7620 | 40.3 |
| | R11 | −21.131 | | | |
| | | | 0.135 | | |
| L7 | R12 | 55.725 | | | |
| | | | 2.454 | 1.8467 | 23.8 |
| | R13 | 26.386 | | | |
| | | | 2.239 | | |
| L8 | R14 | 76.751 | | | |
| | | | 6.000 | 1.8042 | 46.5 |
| | R15 | −22.374 | | | |
| L9 | | | 1.500 | 1.8052 | 25.5 |
| | R16 | −54.363 | | | | where L1–L9 are successive lens elements arranged in six groups, L1, L2; L3; L4; L5, L6, L7; and L8, L9; R1–R16 are the radii of curvature of the successive lens surfaces according to sequence of the surfaces in the overall lens, $N_d$ and $V_d$ are the indexes of refraction and Abbe Numbers, respectively, of the elements L1–L9.

9. The lens of claim 1 defined substantially by the following data as scaled to an equivalent focal length of 28.7mm.

| Lens | | Radius | Axial Distance Between Surfaces | $N_d$ | $V_d$ |
|---|---|---|---|---|---|
| L1 | R1 | 38.570mm | | | |
| | | | 2.435mm | 1.5168 | 64.2 |
| | R2 | 19.187 | | | |
| | | | 8.508 | | |
| L2 | R3 | −118.121 | | | |
| | | | 4.797 | 1.7995 | 42.3 |
| | R4 | −53.498 | | | |
| | | | 4.000−0.25 | | |
| L3 | R5 | 18.556 | | | |
| | | | 2.180 | 1.5831 | 59.5 |
| | R6 | 12.336 | | | |
| | | | 10.615 | | |
| L4 | R7 | 50.120 | | | |
| | | | 2.159 | 1.8306 | 36.5 |
| | R8 | −160.5232 | | | |
| | | | 2.581 | | |
| L5 | R9 | −22.590 | | | |
| | | | 10.883 | 1.7600 | 47.5 |
| | R10 | −21.050 | | | |
| | | | 0.135 | | |
| L6 | R11 | 51.8954 | | | |
| | | | 3.257 | 1.8467 | 23.8 |
| | R12 | 26.298 | | | |
| | | | 2.239 | | |
| L7 | R13 | 77.064 | | | |
| | | | 7.000 | 1.8042 | 46.5 |
| | R14 | −18.570 | | | |
| L8 | | | 1.500 | 1.8052 | 25.5 |
| | R15 | −51.214 | | | | where L1–L8 are successive lens elements arranged in six groups L1, L2; L3; L4; L5; L6; L7, L8; R1–R15 are the radii of curvature of the successive lens surfaces according to the sequence of the surfaces in the overall lens, $N_d$ and $V_d$ are the indexes of refraction and Abbe numbers, respectively, of the elements L1–L8.

10. The lens of claim 1 defined substantially by the following data as scaled to an equivalent focal length of 28.7mm.

| Lens | | Radius | Axial Distance Between Surfaces | $N_d$ | $V_d$ |
|---|---|---|---|---|---|
| L1 | R1 | 39.897mm | | | |
| | | | 2.435mm | 1.520 | 65.6 |
| | R2 | 19.832 | | | |
| | | | 8.500 | | |
| L2 | R3 | −111.180 | | | |
| | | | 5.835 | 1.802 | 47.5 |
| | R4 | −55.111 | | | |
| | | | 4.000−0.25 | | |
| L3 | R5 | 17.557 | | | |
| | | | 2.180 | 1.807 | 44.3 |
| | R6 | 12.193 | | | |
| | | | 10.789 | | |
| L4 | R7 | 47.013 | | | |
| | | | 2.433 | 1.833 | 41.8 |
| | R8 | −138.976 | | | |
| | | | 3.390 | | |
| L5 | R9 | −23.286 | | | |
| | | | 9.700 | 1.837 | 51.9 |
| | R10 | −21.573 | | | |
| | | | 0.135 | | |
| L6 | R11 | 51.904 | | | |
| | | | 3.324 | 1.848 | 23.4 |
| | R12 | 26.009 | | | |
| | | | 2.682 | | |
| L7 | R13 | 85.346 | | | |
| | | | 1.000 | 1.848 | 23.4 |
| | R14 | 31.429 | | | |
| L8 | | | 4.000 | 1.776 | 50.6 |
| | R15 | −43.746 | | | | where L1–L8 are successive lens elements arranged in six groups, L1, L2; L3; L4; L5; L6; L7, L8; R1–R15 are the radii of curvature of the successive lens surfaces according to the sequence of the surfaces in the overall lens, $N_d$ and $V_d$ are the indexes of refraction and Abbe numbers, respectively, of the elements L1–L8.

11. The lens of claim 1 defined substantially by the following data as scaled to an equivalent focal length of 28.5mm.

| Lens | | Radius(mm) | Axial Distance Between Surfaces(mm) | $N_d$ | $V_d$ |
|---|---|---|---|---|---|
| L1 | R1 | 155.101 | | | |
| | | | 4.160 | 1.562 | 58.52 |
| | R2 | −541.744 | | | |
| | | | .300 | | |
| L2 | R3 | 29.242 | | | |
| | | | 3.000 | 1.487 | 70.4 |
| | R4 | 13.031 | | | |
| | | | 12.759 | | |
| L3 | R5 | 22.898 | | | |
| | | | 2.000 | 1.800 | 42.3 |
| | R6 | 15.520 | | | |
| | | | 8.692 | | |
| L4 | R7 | 48.249 | | | |
| | | | 3.200 | 1.785 | 25.7 |
| | R8 | −70.561 | | | |
| | | | 1.967 | | |
| L5 | R9 | −24.204 | | | |
| | | | 2.164 | 1.805 | 25.5 |

-continued

| Lens | | Radius(mm) | Axial Distance Between Surfaces(mm) | $N_d$ | $V_d$ |
|---|---|---|---|---|---|
| | R10 | −1430.264 | | | |
| | | | .844 | | |
| L6 | R11 | −94.529 | | | |
| | | | 5.504 | 1.800 | 42.3 |
| | R12 | −19.767 | | | |
| | | | 3.550–1.028 | | |
| L7 | R13 | 45.215 | | | |
| | | | 2.580 | 1.847 | 23.8 |
| | R14 | 29.179 | | | |
| | | | 1.700 | | |
| L8 | R15 | 70.687 | | | |
| | | | 8.00 | 1.743 | 49.2 |
| L9 | R16 | −19.969 | | | |
| | | | 2.700 | 1.847 | 23.8 |
| | R17 | −44.577 | | | | where L1–L9 are successive lens elements arranged in six groups, L1,L2; L3; L4; L5,L6; L7; L8,L9; R1–R17 are the radii of curvature of the successive lens surfaces according to sequence of the surfaces in the overall lens, $N_d$ and $V_d$ are the indexes of refraction and Abbe Numbers, respectively, of the elements L1–L9.

12. The lens of claim 1 defined substantially by the following data as scaled to an equivalent focal length of 28.6mm.

| Lens | | Radius(mm) | Axial Distance Between Surfaces(mm) | $N_d$ | $V_d$ |
|---|---|---|---|---|---|
| L1 | R1 | 42.160 | | | |
| | | | 5.700 | 1.487 | 70.4 |
| | R2 | 384.104 | | | |
| | | | .300 | | |
| L2 | R3 | 35.935 | | | |
| | | | 2.800 | 1.487 | 70.4 |
| | R4 | 11.488 | | | |
| | | | 4.032 | | |
| L3 | R5 | 26.721 | | | |
| | | | 2.000 | 1,517 | 64.2 |
| | R6 | 15.510 | | | |
| | | | 14.343 | | |
| L4 | R7 | 39.692 | | | |
| | | | 3.200 | 1.689 | 31.2 |
| | R8 | 925.392 | | | |
| | | | 2.973 | | |
| L5 | R9 | −76.847 | | | |
| | | | 2.164 | 1.847 | 23.8 |
| | R10 | 97.091 | | | |
| | | | 1.750 | | |
| L6 | R11 | −75.162 | | | |
| | | | 4.549 | 1.800 | 42.3 |
| | R12 | −21.352 | | | |
| | | | 4.098–.100 | | |
| L7 | R13 | 37.634 | | | |
| | | | 2.700 | 1.722 | 29.2 |
| | R14 | 32.248 | | | |
| | | | 2.000 | | |
| L8 | R15 | 70.613 | | | |
| | | | 8.400 | 1.641 | 59.8 |
| L9 | R16 | −18.940 | | | |
| | | | 2.700 | 1.805 | 25.5 |
| | R17 | −42.358 | | | | where L1–L9 are successive lens elements arranged in six groups, L1,L2; L3; L4; L5,L6; L7; L8,L9; R1–R17 are the radii of curvature of the successive lens surfaces according to sequence of the surfaces in the overall lens, $N_d$ and $V_d$ are the indexes of refraction and Abbe Numbers, respectively, of the elements L1–L9.

13. The lens of claim 1 defined substantially by the following data as scaled to an equivalent focal length of 35.0mm.

| Lens | | Radius(mm) | Axial Distance Between Surfaces(mm) | $N_d$ | $V_d$ |
|---|---|---|---|---|---|
| | R1 | 31.195 | | | |

-continued

| Lens | | Radius(mm) | Axial Distance Between Surfaces(mm) | $N_d$ | $V_d$ |
|---|---|---|---|---|---|
| L1 | | | 2.998 | 1.517 | 64.2 |
| | R2 | 20.569 | | | |
| | | | 7.074 | | |
| L2 | R3 | −96.642 | | | |
| | | | 2.829 | 1.785 | 25.7 |
| | R4 | −58.277 | | | |
| | | | 0.726 | | |
| L3 | R5 | 18.356 | | | |
| | | | 4.321 | 1.723 | 38.0 |
| | R6 | 12.649 | | | |
| | | | 11.925 | | |
| L4 | R7 | 53.996 | | | |
| | | | 2.800 | 1.831 | 36.5 |
| | R8 | −172.838 | | | |
| | | | 3.000 | | |
| L5 | R9 | −22.950 | | | |
| | | | 2.695 | 1.741 | 27.8 |
| | R10 | −276.177 | | | |
| | | | 0.720 | | |
| L6 | R11 | −76.849 | | | |
| | | | 6.081 | 1.757 | 47.7 |
| | R12 | −19.800 | | | |
| | | | 2.000–0.20 | | |
| L7 | R13 | 51.599 | | | |
| | | | 3.000 | 1.847 | 23.8 |
| | R14 | 31.353 | | | |
| | | | 2.332 | | |
| L8 | R15 | 82.914 | | | |
| | | | 7.000 | 1.800 | 42.3 |
| L9 | R16 | −25.647 | | | |
| | | | 3.000 | | |
| | R17 | −57.034 | | | 1.805 | 25.5 | where L1–L9 are successive lens elements arranged in six groups, L1,L2; L3; L4; L5,L6; L7; L8,L9; R1–R17 are the radii of curvature of the successive lens surfaces according to sequence of the surfaces in the overall lens, $N_d$ and $V_d$ are the indexes of refraction and Abbe Numbers, respectively, of the elements L1–L9.

14. The lens of claim 1 defined substantially by the following data as scaled to an equivalent focal length of 35.0mm.

| Lens | | Radius | Axial Distance Between Surfaces | $N_d$ | $V_d$ |
|---|---|---|---|---|---|
| L1 | R1 | 598.84mm | | | |
| | | | 4.160mm | 1.750 | 35.0 |
| | R2 | −175.71 | | | |
| | | | .300 | | |
| L2 | R3 | 22.57 | | | |
| | | | 2.985 | 1.487 | 70.4 |
| | R4 | 13.99 | | | |
| | | | 9.079 | | |
| L3 | R5 | 23.40 | | | |
| | | | 5.005 | 1.700 | 47.8 |
| | R6 | 15.49 | | | |
| | | | 8.869 | | |
| L4 | R7 | 58.80 | | | |
| | | | 3.200 | 1.831 | 36.5 |
| | R8 | −100.28 | | | |
| | | | 2.385 | | |
| L5 | R9 | −24.54 | | | |
| | | | 2.358 | 1.741 | 27.8 |
| | R10 | −845.99 | | | |
| | | | .680 | | |
| L6 | R11 | −102.81 | | | |
| | | | 6.778 | 1.757 | 47.7 |
| | R12 | −19.97 | | | |
| | | | 0.91–3.66 | | |
| L7 | R13 | 58.83 | | | |
| | | | 3.000 | 1.847 | 23.8 |
| | R14 | 32.65 | | | |
| | | | 1.700 | | |
| L8 | R15 | 65.28 | | | |
| | | | 7.300 | 1.800 | 42.3 |
| L9 | R16 | −27.00 | | | |
| | | | 0 | 1.805 | 25.5 |
| | R17 | −79.24 | | | | where L1–L9 are successive lens elements arranged in six groups, L1,L2; L3; L4; L5,L6; L7; L8,l 9;

R1-R17 are the radii of curvature of the successive lens surfaces according to sequence of the surfaces in the overall lens, $N_d$ and $V_d$ are the indexes of refraction and Abbe Numbers, respectively, of the elements L1-L9.

15. The lens of claim 1 defined substantially by the following data as scaled to an equivalent focal length of 35.0mm.

| Lens | | Radius(mm) | Axial Distance Between Surfaces(mm) | $N_d$ | $N_d$ |
|---|---|---|---|---|---|
| L1 | R1 | 30.600 | | | |
| | | | 7.000 | 1.487 | 70.4 |
| | R2 | 170.290 | | | |
| | | | .300 | | |
| L2 | R3 | 34.231 | | | |
| | | | 2.985 | 1.487 | 70.4 |
| | R4 | 11.567 | | | |
| | | | 6.000 | | |
| L3 | R5 | 67.235 | | | |
| | | | 2.000 | 1.569 | 56.0 |
| | R6 | 25.201 | | | |
| | | | 6.171 | | |
| L4 | R7 | 46.077 | | | |
| | | | 3.200 | 1.806 | 40.7 |
| | R8 | −644.608 | | | |
| | | | 7.931 | | |
| L5 | R9 | −34.424 | | | |
| | | | 2.358 | 1.762 | 26.6 |
| | R10 | −829.911 | | | |
| | | | 1.350 | | |
| L6 | R11 | −47.763 | | | |
| | | | 4.832 | | |
| | R12 | −19.289 | | | |
| | | | 4.70−.10 | 1.757 | 47.7 |
| L7 | R13 | 41.514 | | | |
| | | | 3.000 | 1.667 | 33.1 |
| | R14 | 35.544 | | | |
| | | | 1.900 | | |
| L8 | R15 | 64.725 | | | |
| | | | 8.000 | 1.717 | 48.0 |
| L9 | R16 | −22.414 | | | |
| | | | 2.700 | 1.805 | 25.5 |
| | R17 | −56.648 | | | | where L1-L9 are successive lens elements arranged in six groups, L1,L2; L3; L4; L5, L6; L7; L8,L9; R1-R17 are the radii of curvature of the successive lens surfaces according to sequence of the surfaces in the overall lens, $N_d$ and $V_d$ are the indexes of refraction and Abbe Numbers, respectively, of the elements L1-L9.

16. The lens of claim 1 defined substantially by the following data as scaled to an equivalent focal length of 28.5mm.

| Lens | | Radius(mm) | Axial Distance Between Surfaces(mm) | $N_d$ | $V_d$ |
|---|---|---|---|---|---|
| L1 | R1 | 54.600 | | | |
| | | | 5.700 | 1.487 | 70.4 |
| | R2 | 937.48 | | | |
| | | | .300 | | |
| L2 | R3 | 28.640 | | | |
| | | | 2.800 | 1.487 | 70.4 |
| | R4 | 11.392 | | | |
| | | | 4.474 | | |
| L3 | R5 | 28.640 | | | |
| | | | 2.000 | 1.517 | 64.2 |
| | R6 | 15.990 | | | |
| | | | 13.502 | | |
| L4 | R7 | 41.450 | | | |
| | | | 3.200 | 1.689 | 31.2 |
| | R8 | 840.70 | | | |
| | | | 3.342 | | |
| L5 | R9 | −70.750 | | | |
| | | | 2.164 | 1.805 | 25.5 |
| | R10 | 106.030 | | | |
| | | | 1.900 | | |
| L6 | R11 | −71.649 | | | |
| | | | 4.549 | 1.804 | 46.5 |
| | R12 | −21.220 | | | |
| | | | 4.098−.10 | | |
| L7 | R13 | 48.140 | | | |
| | | | 2.700 | 1.741 | 27.8 |
| | R14 | 35.430 | | | |
| | | | 1.212 | | |
| | R15 | 53.960 | | | |
| L8 | R16 | −20.430 | 9.159 | 1.639 | 55.5 |
| L9 | | | 2.700 | 1.805 | 25.5 |
| | R17 | −44.190 | | | | where L1-L9 are successive lens elements arranged in six groups, L1,L2; L3; L4; L5,L6; L7; L8,L9; R1-R17 are the radii of curvature of the successive lens surfaces according to sequence of the surfaces in the overall lens, $N_d$ and $V_d$ are the indexes of refraction and Abbe Numbers, respectively, of the elements L1-L9.

17. the lens of claim 1 further defined by $$1.5 F_o \geq F_{34} \geq 1.0 F_o$$

where $F_{34}$ is the combined equivalent focal length of the third and fourth groups, and $F_o$ is the equivalent focal length of the overall lens.

18. The lens of claim 2 further defined in that the axial distance $D_4$ between the first and last surface of said fourth group is $$0.45 F_o \geq D_4 \geq 0.20 F_o$$

where $F_o$ is the equivalent focal length of the overall lens.

19. The lens of claim 2 further defined by $$2.5 F_o \geq F_3 \geq 1.2 F_o$$

where $F_3$ is the equivalent focal length of said third group, and $F_o$ is the equivalent focal length of the overall lens.

20. The lens of claim 2 further defined by $$2.0 F_o \geq F_6 \geq 1.0 F_o$$

where $F_o$ is the equivalent focal length of the overall lens and $F_6$ is the equivalent focal length of the sixth group.

21. The lens of claim 1 further defined by $$6.5 F_o \geq F_4 \geq 2.5 F_o \text{ and}$$

$$1.5 F_o \geq F_{34} \geq 1.0 F_o$$

where $F_4$ is the equivalent focal length of said fourth group, $F_{34}$ is the combined equivalent focal length of said third and fourth groups and $F_o$ is the equivalent focal length of the overall lens.

22. A retrofocus lens consisting of nine elements and from the object side comprising a first two element group including a positive and a negative lens element of overall negative power, a third element in the form of a negative meniscus having a convex object side surface, a fourth positive element having a convex object side surface, fifth and sixth elements, said fifth element having a concave object side surface and said sixth element having a convex image side surface, said fifth and sixth elements being of overall positive power, a seventh element in the form of a negative meniscus having a convex object side surface, and eighth and ninth elements cemented together and being overall bi-convex.

23. The lens of claim 22 further defined by $$1.5 F_o \geq F_{34} \geq 1.0 F_o$$

where $F_{34}$ is the combined equivalent focal length of the third and fourth groups, and $F_o$ is the equivalent focal length of the overall lens.

24. The lens of claim 22 further defined in that the axial distance $D_4$ between the first and last surface of said fourth group is $$0.45 F_o \geq D_4 \geq 0.20 F_o$$

where $F_o$ is the equivalent focal length of the overall lens.

25. The lens of claim 22 further defined by $$2.5 F_o \geq F_3 \geq 1.2 F_o$$

where $F_3$ is the equivalent focal length of said third group, and $F_o$ is the equivalent focal length of the overall lens.

26. The lens of claim 22 further defined by $$2.0 F_o \geq F_6 \geq 1.0 F_o$$

where $F_o$ is the equivalent focal length of the overall lens and $F_6$ is the equivalent focal length of the sixth group.

27. A retrofocus lens consisting of eight elements and from the object side comprising a first two element group including a positive and negative lens element of overall negative power, a third element in the form of a negative meniscus having a convex object side surface, a fourth positive element having a convex object side surface, a fifth positive element having a concave object side surface and a convex image side surface, a sixth element in the form of a negative meniscus having a convex object side surface, and seventh and eighth elements cemented together and being overall bi-convex.

28. A lens of the retrofocus type which comprises from the object end a first group of a positive and a negative element of overall negative power, a second group of negative power in the form of a meniscus having a concave image side, a third group of positive power having a convex object side surface, a fourth positive group comprising two elements and having a concave object side and a convex image side, a fifth group and a sixth group, said fifth group consisting of a negative meniscus having a convex object side surface, said sixth group consisting of a biconvex doublet.

29. The lens of claim 28 further defined by $$1.5 F_o \geq F_{34} \geq 1.0 F_o$$

where $F_{34}$ is the combined equivalent focal length of the third and fourth groups, and $F_o$ is the equivalent focal length of the overall lens.

30. The lens of claim 28 further defined in that the axial distance $D_4$ between the first and last surface of said fourth group is $$0.45 F_o \geq D_4 \geq 0.20 F_o$$

where $F_o$ is the equivalent focal length of the overall lens.

31. The lens of claim 28 further defined by $$2.5 F_o \geq F_3 \geq 1.2 F_o$$

where $F_3$ is the equivalent focal length of said third group, and $F_o$ is the equivalent focal length of the overall lens.

32. The lens of claim 28 further defined by $$2.0 F_o \geq F_6 \geq 1.0 F_o$$

where $F_o$ is the equivalent focal length of the overall lens and $F_6$ is the equivalent focal length of the sixth group.

33. The lens of claim 28 further defined by $$1.5 F_o \geq F_{34} \geq 1.0 F_o$$

$$0.45 F_o \geq D_4 \geq 0.20 F_o$$

$$2.5 F_o \geq F_3 \geq 1.2 F_o$$

$$2.0 F_o \geq F_6 \geq 1.0 F_o$$

where $F_o$ is the equivalent focal length of the overall lens,
$F_{34}$ is the combined equivalent focal length of the third and fourth groups,
$D_4$ is the axial distance between the front and rear surfaces of the fourth group,
$F_3$ is the equivalent focal length of the third group, and
$F_6$ is the equivalent focal length of the sixth group.

* * * * *

UNITED STATES PATENT AND TRADEMARK OFFICE
CERTIFICATE OF CORRECTION

PATENT NO. : 4,099,849
DATED : July 11, 1978
INVENTOR(S) : John A. Lawson et al

It is certified that error appears in the above-identified patent and that said Letters Patent are hereby corrected as shown below:

Column 4, line 58, after "July 29, 1974" insert --, now U. S. Patent 3,975,090--.

Column 7, line 15, delete "221.3".

Column 7, Table IX, under the heading "Axial Distance Between Surfaces (mm)" delete "28.640" and insert "28.640" under the heading "Radius (mm)", same line.

Column 10, line 5, before "positive" insert --a--.

Column 13, claim 12, under "$N_d$" "1,517" should read --1.517--.

Column 14, claim 14, under "Radius", "598.84mm" should read --1598.84mm--.

Column 16, line 1 of claim 17, "claim 1" should read --claim 2--.

Column 17, line 3 of claim 27, before "negative" insert --a--.

Signed and Sealed this

Sixth Day of February 1979

[SEAL]

Attest:

RUTH C. MASON
Attesting Officer

DONALD W. BANNER
Commissioner of Patents and Trademarks